US006811158B2

(12) United States Patent
Heinlein et al.

(10) Patent No.: US 6,811,158 B2
(45) Date of Patent: Nov. 2, 2004

(54) SEAL

(75) Inventors: Carl Edward Heinlein, Newport (GB); Bruce Montgomery Gardiner, Powys (GB)

(73) Assignee: Meritor Heavy Vehicle Braking Systems (UK) Limited (GB)

( * ) Notice: Subject to any disclaimer, the term of this patent is extended or adjusted under 35 U.S.C. 154(b) by 0 days.

(21) Appl. No.: 10/220,553

(22) PCT Filed: Mar. 2, 2001

(86) PCT No.: PCT/GB01/00914

§ 371 (c)(1),
(2), (4) Date: Jan. 10, 2003

(87) PCT Pub. No.: WO01/65153

PCT Pub. Date: Sep. 7, 2001

(65) Prior Publication Data

US 2003/0141670 A1 Jul. 31, 2003

(30) Foreign Application Priority Data

Mar. 2, 2000 (GB) .............................. 0004953

(51) Int. Cl.[7] ............................................... F16J 15/52
(52) U.S. Cl. .......................... 277/634; 92/168; 74/18.2
(58) Field of Search ........................... 92/168; 277/504, 277/634–6; 188/18 A; 74/18.2

(56) References Cited

U.S. PATENT DOCUMENTS 3,490,343 A * 1/1970 Afanador et al. ............. 92/168
4,156,532 A   5/1979 Kawaguchi et al.
4,199,159 A * 4/1980 Evans ......................... 277/636
4,270,442 A   6/1981 Bainard et al.
4,447,066 A * 5/1984 Katagiri et al. ............. 277/636
4,635,760 A * 1/1987 Le Marchand et al. ..... 188/71.9
4,685,686 A * 8/1987 Weiler ......................... 277/636
5,299,665 A * 4/1994 Weiler et al. ............. 188/73.44

FOREIGN PATENT DOCUMENTS

| DE | 38 14 695 | 11/1989 |
| DE | 2 771 463 | 11/1997 |
| EP | 0 144 552 | 6/1985 |
| GB | 907 715 | 10/1962 |

OTHER PUBLICATIONS

International Search Report for PCT/GB01/00914 dated May 30, 2001.

* cited by examiner

Primary Examiner—Alison K. Pickard
(74) Attorney, Agent, or Firm—Carlson, Gaskey & Olds

(57) ABSTRACT

A seal for sealing an interface between a piston shaft (4) of an expander mechanism for a disk brake and an inner surface of a housing (5) of the brake in which the shaft is received is described. The seal comprises: a laterally outwardly disposed portion (11) adapted to engage a portion of the housing in fixed relation therewith; a laterally inwardly disposed portion (12) which is adapted to form a static seal with a surface of the shaft; and an intermediate portion (13) interconnecting said laterally outwardly disposed portion (11) and said laterally inwardly disposed portion (12) such that the laterally inwardly disposed portion is permitted to move axially together with the shaft relative to the laterally outwardly disposed portion, in use, in static sealing relationship with the shaft.

9 Claims, 2 Drawing Sheets

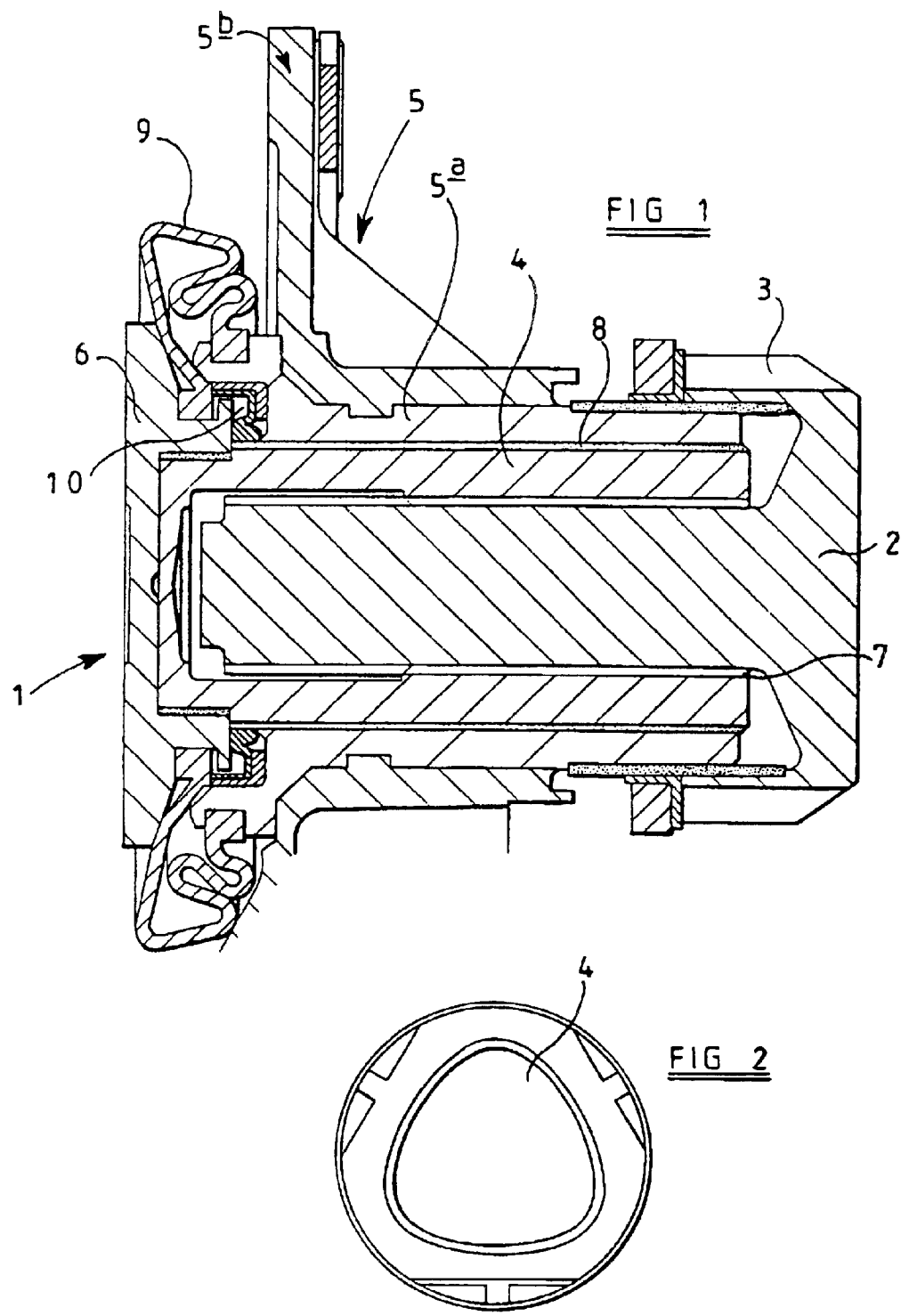

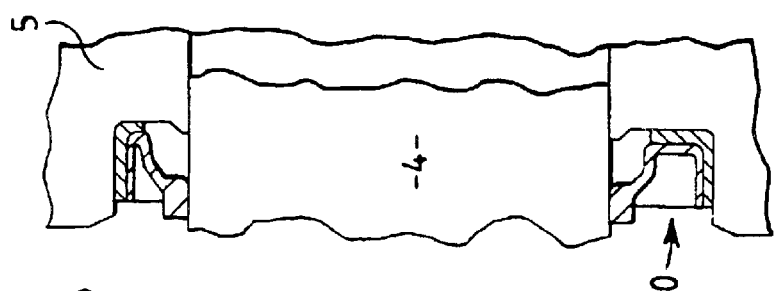
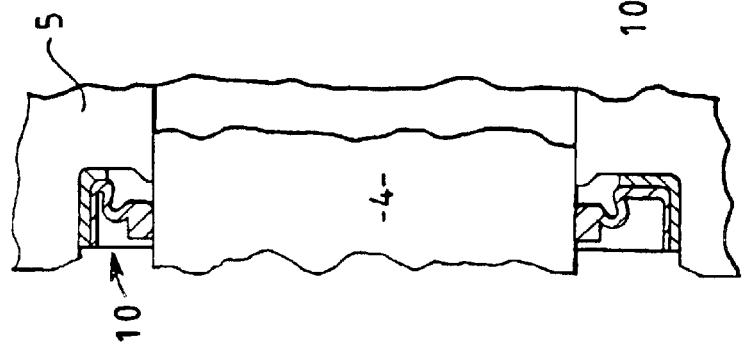
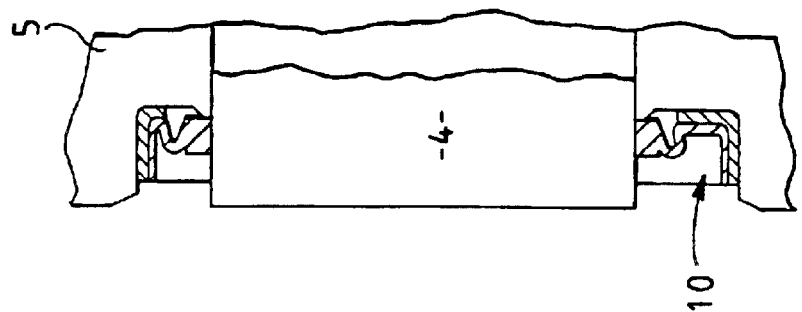
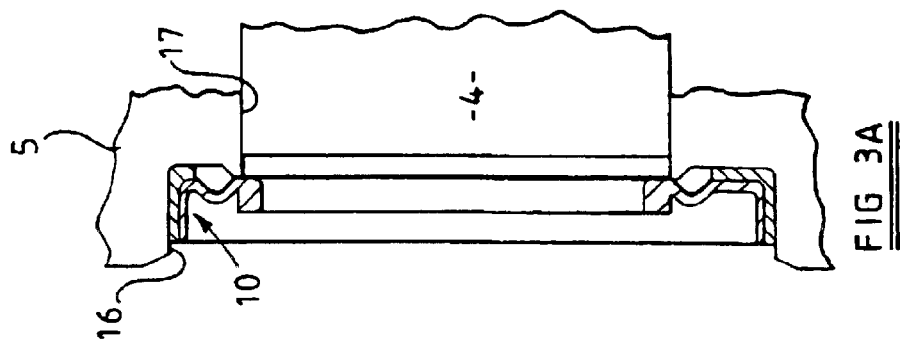
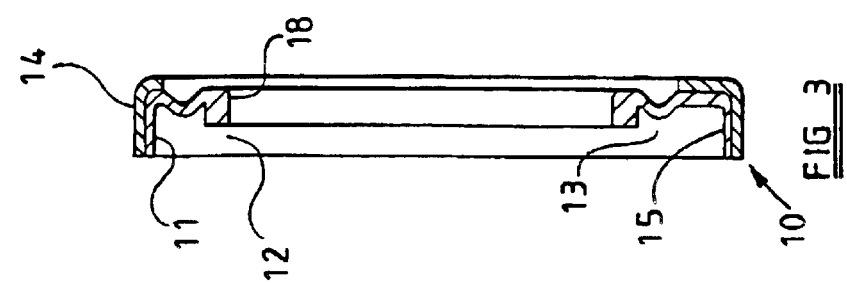

SEAL

This application claims priority to PCT/GB01/00914 filed Mar. 2, 2001, which further claims priority to GB 00 04953.6 filed Mar. 2, 2000.

BACKGROUND OF THE INVENTION

The invention relates to a seal for sealing an interface between a piston shaft of an expander mechanism, for example in the form of an adjustable piston, for a disk brake, and a laterally inner surface of a housing of the brake in which the shaft is received.

Seals of the type described in the last preceding paragraph are known which have a laterally inwardly disposed portion adapted to form a wiper seal with an outer surface of the piston shaft. In use, a piston shaft inserted in the known type of seal moves along a longitudinal axis of the shaft relative to the laterally inwardly disposed portion of the seal to accommodate regular movement of the piston shaft during operation of the brake and also to accommodate movement of the piston shaft caused by lengthening of the expander mechanism to compensate for brake friction element wear. In this connection, a piston shaft generally moves axially by about 1 to 2 mm, for example, during normal braking, and by up to about 20 mm, for example, during adjustment of expander mechanism length to compensate for brake friction element wear.

The laterally inwardly disposed seal portion which forms the wiper seal is subjected to a significant amount of wear. Furthermore, the seal materials suitable to satisfy the operational requirements of wiper seals generally have a lesser ability to withstand high temperatures. This is significant in the operational environment to which disk brake expander mechanisms are exposed, where high temperatures are common because of the proximity of brake friction elements to the expander mechanism.

Seals of the above described type, which engage a laterally outer surface of a piston shaft, in use, are generally provided in the form of secondary seals, to prevent dirt and debris from jamming the expander mechanism in the event of failure of a primary seal which is generally provided between a piston head of the piston assembly and the brake housing in which the piston shaft is received.

SUMMARY OF THE INVENTION

According to the invention, there is provided a seal for sealing an interface between a piston shaft of an expander mechanism for a disk brake and an inner surface of a housing of the brake in which the shaft is received, the seal comprising:

a laterally outwardly disposed portion adapted to engage a portion of the housing in fixed relation therewith;

a laterally inwardly disposed portion adapted to form a static seal with a surface of the shaft; and an intermediate portion interconnecting said laterally outwardly disposed portion and said laterally inwardly disposed portion such that the laterally inwardly disposed portion is permitted to move axially together with the shaft relative to the laterally outwardly disposed portion, in use, in static sealing relationship with the shaft.

This facilitates provision of a static seal with the shaft during regular movement of the shaft relative to the housing for accommodating normal braking movement of the shaft, and avoids the necessity for a conventional wiper seal to accommodate such movement.

The invention is particularly advantageous in that it facilitates the reduction of seal wear against the piston shaft caused by regular brake operation, and/or in that it facilitates the use of a material with a higher temperature capability for fabrication of the seal than would be possible if a conventional wiper seal were provided for engaging with the piston shaft. Furthermore, a more secure seal can be provided with the piston shaft compared to conventional wiper seals, which tend to wear and lose interference on the piston shaft. Still further, less stringent design constraints are placed on the surface of the piston shaft outer surface.

The laterally inwardly disposed portion of the seal may also be adapted to accommodate occasional axial sliding movement of the laterally inwardly disposed portion of the seal relative to the piston shaft, in use, without losing seal integrity. Such axial sliding movement can occur, for example, during lengthening of the expander mechanism in order to compensate for wear of wearable friction elements of the brake, whereby the rest position of the piston shaft is adjusted axially relative to the housing. This facilitates restricting the occurrence of such sliding movement and consequential seal wear to occasions of large relative movement such as that caused by lengthening of the expander mechanism, and the avoidance of sliding during the many small movements made by the piston shaft during normal brake applications. With certain seal designs in accordance with the invention, relative sliding between the laterally inwardly disposed portion of the seal and the piston shaft might also be expected to occur during very hard brake applications, where travel of the piston shaft exceeds that experienced during the vast majority of brake applications.

The intermediate portion may comprise a flexible web. The web may be adapted to permit bellows-like lateral flexure of the web when a piston shaft is disposed through the seal in an unadjusted condition of the adjustable expander mechanism.

The web may be of substantially uniform thickness.

Preferably, lateral dimensions of the intermediate portion are chosen to be significantly greater than the minimum lateral distance, in use, in the unadjusted condition of the expander mechanism, between the laterally outwardly disposed portion and the laterally inwardly disposed portion.

The laterally inwardly disposed portion may comprise a rim having an axially and laterally inwardly disposed bevel for facilitating insertion of a piston shaft through the seal, in use.

The laterally outwardly disposed portion may comprise a relatively thin, laterally outer, axially extending, extension of the intermediate portion, bonded to a substantially rigid laterally outermost member.

BRIEF DESCRIPTION OF THE DRAWINGS

In order that the invention may be better understood, an embodiment thereof will now be described, by way of example only, with reference to the accompanying drawings, in which:

FIG. 1 is a schematic drawing showing an adjustable expander mechanism, in the form of an adjustable piston, for a disk brake, including a secondary seal in accordance with an embodiment of the invention;

FIG. 2 is an end view of the secondary seal;

FIG. 3 is a longitudinal cross-sectional view showing the secondary seal; and

FIGS. 3A to 3D are partial cross-sectional views showing the disposition of portions of the seal during assembly of the piston shaft into a housing and during operation of the piston shaft, in use, under various braking conditions.

DETAILED DESCRIPTION OF A PREFERRED EMBODIMENT

FIG. 1 shows an adjustable piston assembly for use in a disk brake, for example in a motor vehicle. The piston assembly includes an adjustable piston, shown generally as 1, which includes a piston shaft 4 and a tappet 2 rotatably drivable within the assembly by means of circumferentially spaced gear teeth 3. The tappet 2 has a threaded cylindrical portion which is received inside the piston shaft 4 having a corresponding internal thread. The piston shaft 4 has a trilobular external surface which is received in a correspondingly configured opening 17 in a piston shaft housing 5 of the assembly. The piston shaft housing 5 comprises a bush 5A within a housing portion 5B. A piston head 6 is mounted to a closed end portion of the piston shaft 4 so as to prevent significant axial movement of the piston head 6 relative to the piston shaft 4.

The assembly is disposed in a disk brake with the piston head 6 adjacent a friction element, for example a friction pad (not shown), of the brake. Force is then applied by a brake actuator (not shown) to the piston 1 from the right in the orientation of the assembly shown in FIG. 1 so as to cause the piston head 6 to exert a braking force on the friction element. It should be apparent that the piston 1 moves relative to the housing 5, 5A during this braking action.

To adjust the length of the piston 2, 4, 6, tappet 2 is rotated so as to cause relative axial movement between the piston shaft 4 and the tappet 2 by virtue of the action of the mating threads. The trilobular configuration of the laterally outer surface of the piston shaft 4 in its corresponding recess in the housing 5 prevents rotation of the piston shaft 4 relative to the housing 5 thereby ensuring that rotation of the tappet 2 results in axial lengthening of the piston 2, 4, 6, for accommodating wear in the brake friction element, for example. Grease 7 is provided to facilitate unimpeded relative rotational movement of the tappet 2 relative to the piston shaft 4. Further grease 8 is also provided to facilitate smooth relative axial movement between the piston shaft 4 and the housing 5, 5a.

It is important to prevent the ingress of particles of dirt and debris into the sliding interface between the trilobular outer surface of the piston shaft 4 and the corresponding inner surface of the opening 17 of the housing 5. To this end, a primary seal 9 is provided between the piston head 6 and a portion of the bush 5A of the housing 5. Because location of the assembly in a vehicle often makes the assembly susceptible to the ingress of dirt and debris particles, and because of the safety critical nature of the brakes in a vehicle, a secondary seal 10 is provided to further prevent the ingress of dirt and debris into the piston. The primary purpose of the secondary seal 10 is to protect the piston in the eventuality that the primary seal 9 fails, until such time that the primary seal 9 is replaced, typically at the next pad change when damage may be detected.

The secondary seal 10 is shown in greater detail in FIGS. 2 and 3. The seal 10 comprises a laterally outwardly disposed portion 11, a laterally inwardly disposed portion 12, and an intermediate portion 13 interconnecting the portions 11 and 12. The laterally outwardly disposed portion 11 comprises a laterally outer portion in the form of a relatively rigid member 14, and a laterally inner portion 15. The laterally inwardly disposed portion 12, the intermediate portion 13, and the laterally inner portion of the laterally outwardly disposed portion 11, are provided by an integrally formed member of relatively flexible material.

FIGS. 3A to 3D show the seal 10 fitted in an adjustable piston assembly. The laterally outwardly disposed portion 11 of the seal 10 is located in a recess 16 of the housing 5 adjacent a mouth of the opening 17.

As best seen in FIG. 3A, with the seal 10 fitted in the housing 5 prior to insertion of the piston shaft 4 into the assembly, the laterally inwardly disposed seal portion 12 extends laterally inwardly of the housing inner peripheral surface defining the opening 17. On further insertion of the piston shaft 4 through the opening 17 as shown in FIG. 3B, the piston shaft 4 impinges on a bevel 18 of the laterally inwardly disposed portion 12 and forces the laterally inwardly disposed portion 12 laterally outwardly, causing the intermediate portion 13 to flex laterally in a bellows-like action for accommodating the shaft 4.

In FIG. 3B, the piston shaft 4 is shown in the brakes-off condition. The laterally inwardly disposed portion 12 of the seal 10 forms a static seal with the laterally outer surface of the trilobular shaft 4.

FIGS. 3C and 3D show the configuration of the seal 10 during a light brake application (FIG. 3C) as well as a heavier brake application (FIG. 3D). The different force with which the brake clamps the friction pads results in different amounts of axial movement of piston shaft 4 within the housing 5. The intermediate seal portion 13 can be seen in FIGS. 3C and 3D to extend from its folded position to accommodate the axial movement of the laterally inwardly disposed portion 12 of the seal 10. The portion 12 therefore moves axially with the shaft 4 and maintains a static seal with the shaft 4 during such limited normal operational movement.

Maintenance of a static seal between the seal 10 and the shaft 4 in this manner results in a more secure sealing action. Furthermore, the surface finish of the shaft 4 does not need to be of such high quality as would be necessary for use with a wiper seal. Still further, because the laterally inwardly disposed portion 12 of the seal 10 does not have to cope with a regular sliding action to accommodate normal sealing movements, the material of the seal 10 can be selected to have a higher temperature resistance. In this connection, the selection of material suitable for fabricating wiper seals involves a compromise to achieve a balance between wear and temperature resistance.

It should be noted, however, that the seal 10 is capable of maintaining sealing efficacy by sliding on the piston shaft 4 during routine operational adjustment of the length of the piston 1, to accommodate the resulting axial movement of the piston shaft 4 relative to the housing 5, and also during abnormally hard brake applications.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An expander mechanism for a disc brake comprising:
   a piston shaft locatable within a housing of the brake; and
   a seal for sealing an interface between the piston shaft and an inner surface of the housing of the brake, the seal comprising
      a laterally outwardly disposed portion that engages a portion of the housing in fixed relation therewith;

a laterally inwardly disposed portion that forms a static seal with a surface of the piston shaft; and an intermediate portion having a predetermined lateral dimension interconnecting said laterally outwardly disposed portion and said laterally inwardly disposed portion such that the laterally inwardly disposed portion is permitted to move axially together with the piston shaft relative to the laterally outwardly disposed portion to a limited extent as governed by intermediate portion in a static sealing relationship with the piston shaft, wherein the laterally inwardly disposed portion of the seal is resiliently constricted around the piston shaft to selectively permit axial sliding movement of the lateral inwardly disposed portion of the seal relative to the piston shaft without losing seal integrity when tho piston shaft moves more than the lateral dimension of the intermediate portion.

2. A mechanism as claimed in claim 1, wherein the intermediate portion comprises a flexible web.

3. A mechanism as claimed in claim 2, wherein the web moves in a bellows-like lateral flexure movement when the piston shaft is disposed through the seal in an unadjusted condition of the expander mechanism.

4. A mechanism as claimed in claim 2, wherein the web is of substantially uniform thickness.

5. A mechanism as claimed in claim 1, wherein a lateral dimension of the intermediate portion is chosen to be significantly greater than a minimum lateral distance in an unadjusted condition of the expander mechanism, between the laterally outwardly disposed portion and the laterally inwardly disposed portion.

6. A mechanism as claimed in claim 1, wherein the laterally inwardly disposed portion comprises a rim having an axially and laterally inwardly disposed bevel for facilitating insertion of a piston shaft through the seal.

7. A mechanism as claimed in claim 1, wherein the laterally outwardly disposed portion comprises a relatively thin, laterally outer, axially extending, extension of the intermediate portion, bonded to a substantially rigid laterally outermost member.

8. A mechanism as claimed in claim 1, wherein the laterally inwardly disposed portion of the seal accommodates axial sliding movement during at least one of an operational adjustment of the length of the piston shaft and an abnormally hard brake application.

9. A mechanism as claimed in claim 1, wherein the piston shaft has a substantially consistent cross-section along a length over which the sliding movement of the seal relative to the piston shaft occurs.

* * * * *